No. 893,207.  
PATENTED JULY 14, 1908.  
S. A. TABET.  
PROCESS OF WELDING COPPER.  
APPLICATION FILED JAN. 3, 1908.
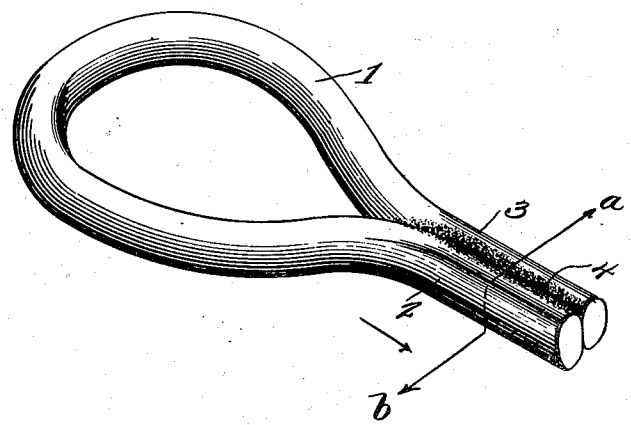
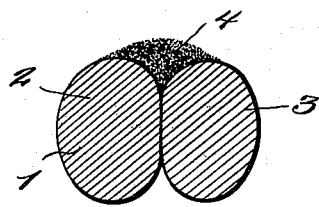
Witnesses  
Inventor  
S. Abraham Tabet  
By  
Attorney

UNITED STATES PATENT OFFICE.

SAHLIAH ABRAHAM TABET, OF NORFOLK, VIRGINIA.

PROCESS OF WELDING COPPER.

No. 893,207.  Specification of Letters Patent.  Patented July 14, 1908.

Application filed January 3, 1908. Serial No. 409,169.

*To all whom it may concern:*

Be it known that I, SAHLIAH ABRAHAM TABET, a native of Syria, but having declared my intention of becoming a citizen of the United States, residing at Norfolk, in the county of Norfolk, State of Virginia, have invented certain new and useful Improvements in Processes of Welding Copper, of which the following is a description, reference being had to the accompanying drawings, forming a part hereof.

My invention relates to the art of welding copper and it consists in the method or process disclosed in the following specification and specifically claimed in the clauses of the concluding claim.

I have in the accompanying drawing illustrated a piece of copper the ends of which are to be welded together by my process as hereinafter disclosed, although it will be understood that my process is applicable to pieces of copper of any form, and that my process is in no way limited to the particular form of the finished article which I have selected for the purpose of illustrating my process.

In the drawing, Figure 1 is a perspective view of a copper rod, the ends whereof are to be welded together, and Fig. 2 is a cross-section upon the line a—b of Fig. 1.

In the drawing, 1 is a piece of copper rod bent upon itself so as to bring the ends 2 and 3 thereof together as shown. The meeting surfaces of the ends of the rod may be slightly flattened so as to increase the area of contact as shown in Fig. 2, although this is not absolutely necessary. I now place a quantity of copper filings, or a quantity of copper finely comminuted by means of any other suitable process, along the meeting surfaces of the ends of the rod to be welded together, as shown at 4, together with a suitable flux, and I have employed borax as a flux with satisfactory results. It will be advisable when borax is employed as a flux to place the borax on the joint before the copper filings and to heat the joint until the water of crystallization is driven off and the borax melted, after which the copper filings are placed upon the joint. The ends of the rod, with the finely comminuted copper and flux, are now heated until the copper filings are seen to begin to melt and commence to run down into the joint between the ends of the rod, at which time the rod is removed from the heating means and the ends thereof forced together as by means of repeated blows upon an anvil as in the ordinary method of welding iron, whereby a perfect weld will be accomplished between the ends of the rod and the said ends securely welded together.

By my process as above set forth I am able to weld copper in an ordinary open fire such as a blacksmith's forge using the ordinary fuel usually used by blacksmiths, although it will be understood that the method of heating is not material to the performance of my process.

Having thus described my invention and disclosed a way by which it may be performed, I claim and desire to secure by Letters Patent:—

The method of welding copper which consists in placing the pieces to be joined together, placing a quantity of finely comminuted copper together with a suitable flux along the joint to be formed, heating the joint until the finely comminuted copper melts, and forcing the ends of said pieces together to form a weld.

This specification signed and witnessed this 3rd day of January A. D. 1908.

S. ABRAHAM TABET.

In the presence of—
A. P. GREELEY,
R. N. FLINT.